United States Patent
Wiencke et al.

(10) Patent No.: US 11,645,083 B2
(45) Date of Patent: May 9, 2023

(54) PROCESSOR HAVING ADAPTIVE PIPELINE WITH LATENCY REDUCTION LOGIC THAT SELECTIVELY EXECUTES INSTRUCTIONS TO REDUCE LATENCY

(71) Applicant: TEXAS INSTRUMENTS INCORPORATED, Dallas, TX (US)

(72) Inventors: Christian Wiencke, Garching (DE); Shrey Sudhir Bhatia, Freising (DE); Jeroen Vliegen, Fahrenzhausen (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 142 days.

(21) Appl. No.: 13/974,571

(22) Filed: Aug. 23, 2013

(65) Prior Publication Data
US 2015/0058602 A1    Feb. 26, 2015

(51) Int. Cl.
*G06F 9/38* (2018.01)

(52) U.S. Cl.
CPC .......... *G06F 9/3873* (2013.01); *G06F 9/3838* (2013.01)

(58) Field of Classification Search
CPC .... G06F 9/3873; G06F 9/3875; G06F 9/3871; G06F 9/3867; G06F 9/3869; G06F 9/3826; G06F 9/383; G06F 9/3832
USPC ........................................................ 712/218
See application file for complete search history.

(56) References Cited

U.S. PATENT DOCUMENTS

| | | | | |
|---|---|---|---|---|
| 5,471,626 A * | 11/1995 | Carnevale | ............. | G06F 9/3873 712/219 |
| 5,619,668 A * | 4/1997 | Zaidi | ..................... | G06F 9/3826 712/200 |
| 5,649,174 A * | 7/1997 | Dockser | ................ | G06F 9/3001 712/200 |
| 5,778,250 A * | 7/1998 | Dye | ...................... | G06F 9/3004 712/32 |
| 5,802,331 A * | 9/1998 | Van Berkel | ........... | G06F 9/3871 712/1 |
| 6,018,796 A * | 1/2000 | Suzuki | .................. | G06F 9/3867 712/41 |
| 6,839,833 B1 * | 1/2005 | Hartnett | ................ | G06F 9/3836 712/205 |

(Continued)

OTHER PUBLICATIONS

A. Efthymiou and J. D. Garside, "Adaptive pipeline structures for speculation control," Asynchronous Circuits and Systems, 2003. Proceedings. Ninth International Symposium on, 2003, pp. 46-55.*

(Continued)

*Primary Examiner* — Keith E Vicary
(74) *Attorney, Agent, or Firm* — Krista Y. Chan; Frank D. Cimino

(57) ABSTRACT

A system and method for reducing pipeline latency. In one embodiment, a processing system includes a processing pipeline. The processing pipeline includes a plurality of processing stages. Each stage is configured to further processing provided by a previous stage. A first of the stages is configured to perform a first function in a pipeline cycle. A second of the stages is disposed downstream of the first of the stages, and is configured to perform, in a pipeline cycle, a second function that is different from the first function. The first of the stages is further configured to selectably perform the first function and the second function in a pipeline cycle, and bypass the second of the stages.

12 Claims, 2 Drawing Sheets

(56) References Cited

U.S. PATENT DOCUMENTS

| | | | |
|---|---|---|---|
| 8,806,181 B1* | 8/2014 | O'Bleness | G06F 9/3869 712/228 |
| 9,563,432 B2* | 2/2017 | Segelken | G06F 9/30174 |
| 2002/0199085 A1* | 12/2002 | Norden | G06F 9/3867 712/219 |
| 2003/0208672 A1* | 11/2003 | Leenstra | G06F 9/3836 712/200 |
| 2003/0226000 A1* | 12/2003 | Rhoades | G06F 9/30181 712/218 |
| 2006/0095745 A1* | 5/2006 | Tran | G06F 9/3016 712/238 |
| 2007/0271449 A1* | 11/2007 | Lichtensteiger | G06F 9/3836 712/244 |
| 2008/0162891 A1* | 7/2008 | Pittman | G06F 9/30181 712/220 |
| 2008/0244234 A1* | 10/2008 | Seth | G06F 9/3836 712/219 |
| 2009/0138674 A1* | 5/2009 | Chang | G06F 9/30181 712/23 |
| 2009/0198970 A1* | 8/2009 | Emma | G06F 9/383 712/220 |
| 2009/0292907 A1* | 11/2009 | Schwinn | G06F 1/3203 712/229 |
| 2009/0327670 A1* | 12/2009 | Orbach | G06F 9/3869 712/229 |
| 2014/0281423 A1* | 9/2014 | Caulfield | G06F 9/30079 712/225 |

OTHER PUBLICATIONS

Stokes, Jon. Inside the machine: an illustrated introduction to microprocessors and computer architecture. No starch press, 2007; title page, copyright page pp. 26, 30, 37, 58, and 75 (7 total pages) (Year: 2007).*

* cited by examiner

PROCESSOR HAVING ADAPTIVE PIPELINE WITH LATENCY REDUCTION LOGIC THAT SELECTIVELY EXECUTES INSTRUCTIONS TO REDUCE LATENCY

BACKGROUND

Pipelining is one technique employed to increase the performance of processing systems such as microprocessors. Pipelining divides the execution of an instruction (or operation) into a number of stages where each stage corresponds to one step in the execution of the instruction. As each stage completes processing of a given instruction, and processing of the given instruction passes to a subsequent stage, the stage becomes available to commence processing of the next instruction. Thus, pipelining increases the overall rate at which instructions can be executed by partitioning execution into a plurality of steps that allow a new instruction to begin execution before execution of a previous instruction is complete. While pipelining increases the rate of instruction execution, pipelining also tends to increase instruction latency.

SUMMARY

A system and method for reducing pipeline latency are disclosed herein. In one embodiment, a processor includes an execution pipeline and pipeline control logic. The execution pipeline includes a plurality of stages. The pipeline control logic is configured to identify an instruction being executed in the pipeline; to determine whether the identified instruction can be processed using fewer than a total number of the pipeline stages; and to selectably configure the pipeline to process the identified instruction using fewer than the total number of pipeline stages.

In another embodiment, a processing system includes a processing pipeline. The processing pipeline includes a plurality of processing stages. Each stage is configured to further processing provided by a previous stage. A first of the stages is configured to perform a first function in a pipeline cycle. A second of the stages is disposed downstream of the first of the stages, and is configured to perform, in a pipeline cycle, a second function that is different from the first function. The first of the stages is further configured to selectably perform the first function and the second function in a pipeline cycle, and bypass the second of the stages.

In a further embodiment, a method includes identifying, during execution, an instruction being executed in an execution pipeline comprising a plurality of stages. Whether the identified instruction can be processed using fewer than a total number of stages of the pipeline is determined. Responsive to the determination, the pipeline is configured to process the identified instruction using fewer than the total number of stages of the pipeline.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
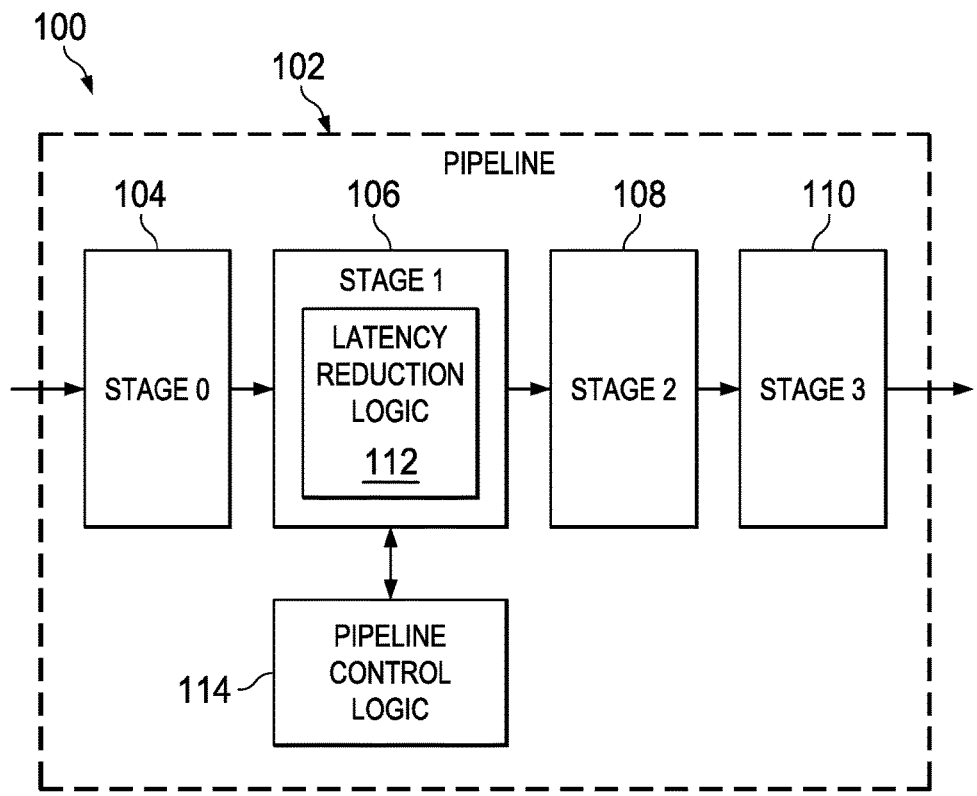
FIG. 1 shows a block diagram of a processing system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Processing systems, such as processors and other data manipulation systems, include pipelines to increase the processing rate of the system. The latency introduced by pipelining is generally considered acceptable given the increased throughput provided by the pipelining. However, in some situations pipeline latency can have a significant impact on system performance. Hazards, such as inter-instruction data dependencies (data hazards) and changes in instruction flow (control hazards) can result in an undesirable degree of additional pipeline latency. One conventional technique of dealing with pipeline hazards includes stalling the pipeline until the hazard is resolved. As pipeline length increases, the time the pipeline is stalled to resolve a hazard may also increase. Consequently, in conventional systems, pipeline stalls associated with hazard resolution can significantly degrade system performance.

Embodiments of the processing system and pipeline disclosed herein reduce the latency associated with pipeline hazards, or other pipeline disruptions, and as a result, increase the overall throughput of the processing system. Embodiments reduce latency by varying the length of the pipeline based on the instruction or operation being executed in the pipeline. The pipeline identifies various operations that may cause a hazard, and reduces the length of the pipeline applied to execute the operation. By reducing the length of the pipeline applied to the operation, the number of pipeline cycles during which the pipeline is stalled in association with the operation is also reduced. For operations identified as not executable via a reduced length pipeline, embodiments may apply the full length pipeline.

FIG. 1 shows a block diagram of a processing system 100 in accordance with various embodiments. The processing system 100 may be a processor, such as a general purpose microprocessor, a microcontroller, a digital signal processor, or other system that includes a processing pipeline. The system 100 includes a pipeline 102. The pipeline 102 includes a plurality of successively coupled processing stages 104-110. Various embodiments of the pipeline 102 may include more or fewer stages than are illustrated in FIG. 1.

Each stage 104-110 provides processing functionality and each stage 106-110 provides processing functionality that furthers the processing provided by the previous stage. For example, in the pipeline 102, stage 0 104 may include a fetch unit that fetches instructions and/or data from storage for execution/manipulation. Stage 1 106 may include a decode unit that decodes instructions provided by the fetch unit of stage 0 104. Stage 2 108 may include an execution unit that executes an instruction in accordance with the instruction decoding provided by stage 1 106. Stage 3 110 may include a write-back unit that stores results of execution provided by the execution unit of stage 2 108 to a selected storage device, such as memory or registers. The stages 104-110 may provide different functionality in some embodiments of the pipeline 102.

Stage 1 106 also includes latency reduction logic 112. The latency reduction logic 112 provides to stage 1 106 functionality of succeeding 108 stages 108 and/or 110 that is applied to execute functions of the succeeding stages in stage 1 106 with respect to one or more selected instructions. For example, if stage 1 106 is a decoding stage, then the latency reduction logic 112 may include execution logic used to execute selected instructions and writeback logic used to store the result of execution for the selected instructions. Thus, the pipeline 102 may execute the selected instructions in a reduced length pipeline that includes only stages 104 and 106. In some embodiments of the pipeline 102, latency reduction logic may be included in one or more stages of the pipeline 102 to provide various pipeline lengths in accordance with the instructions targeted for execution in each stage.

In some embodiments of the system 100, the latency reduction logic 112 may allow stage 1 106 to perform the functions of succeeding pipeline stages with regard to instructions that can cause pipeline dependencies, and in turn cause pipeline hazards. In such embodiments, instructions that do not cause pipeline dependencies are executed using the full length of the pipeline rather than a reduced length pipeline. Such embodiments advantageously provide reduced pipeline latency when hazards occur, but maintain a high overall clock or execution rate by limiting the logic/functionality included in each pipeline stage.

Pipeline control logic 114 is coupled to pipeline stage 1 106 and the latency reduction logic 112. The pipeline control logic 114 identifies the instructions being executed in the pipeline 102, and selects, in accordance with the identified instruction, whether the pipeline stage 106 is to apply the latency reduction logic 112 to reduce pipeline length or to apply the full pipeline length. In some embodiments of the pipeline 102, the pipeline control logic 114 may be included in stage 106, e.g., in conjunction with or part of the latency reduction logic 112.

Figure 2:
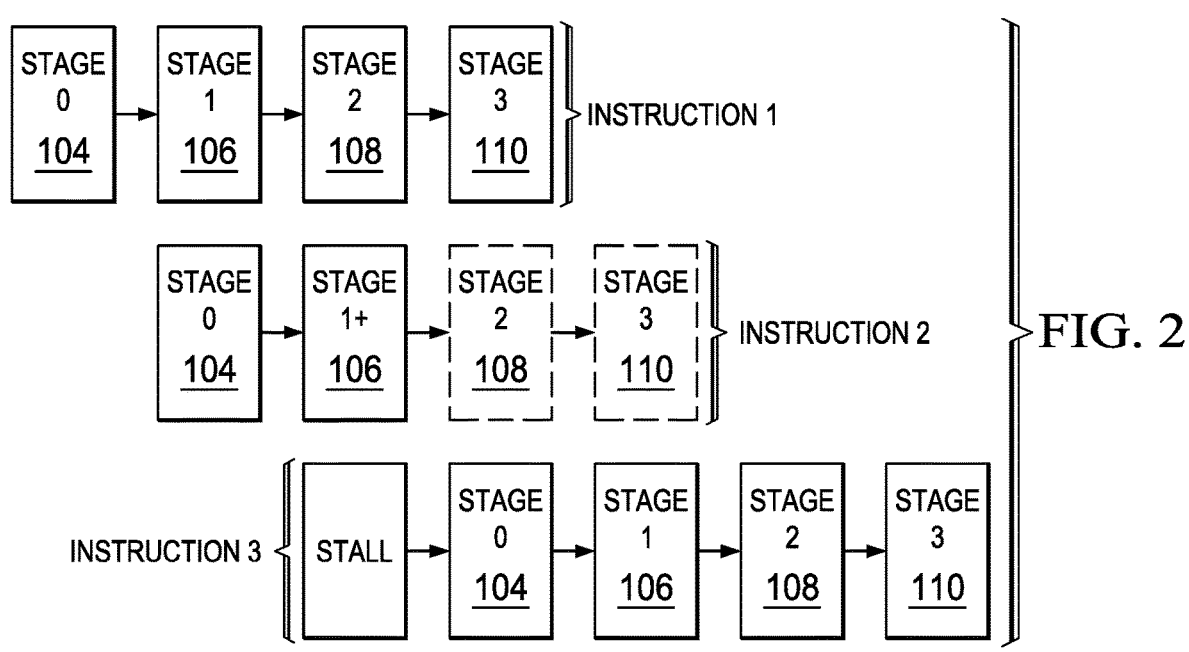
FIG. 2 shows execution of instructions in a pipeline in accordance with various embodiments.

FIG. 2 shows execution of instructions in the pipeline 102 in accordance with various embodiments. More specifically, FIG. 2 shows execution of three instructions in the pipeline 102. While executing Instruction 1, the pipeline control logic 114 identifies Instruction 1 as an instruction that cannot be executed in the reduced length pipeline formed of stages 104-106. Accordingly, the pipeline control logic 114 configures stage 1 106 to execute Instruction 1 without use of the latency reduction logic 112, and Instruction 1 is executed using all the stages of the pipeline 102.

While executing Instruction 2, the pipeline control logic 114 identifies Instruction 2 as an instruction that can be executed in the reduced length pipeline formed of stages 104-106. The pipeline control logic 114 may also evaluate an effect of execution of Instruction 2 on the pipeline 102, and determine that the effect indicates that the Instruction 2 should be executed using the reduced length pipeline. Accordingly, the pipeline control logic 112 114 configures stage 1 106 to execute Instruction 2 using the latency reduction logic 112, and Instruction 2 is executed using the reduced length pipeline of stages 104-106.

The pipeline control logic 114 may identify Instruction 2 as causing a pipeline hazard. Execution of Instruction 2 in the reduced length pipeline reduces the latency caused by stalling the pipeline 102 to resolve the hazard. Execution of Instruction 2 using the reduced length pipeline stalls the execution of Instruction 3 by a single cycle, while execution of Instruction 2 using the full length pipeline 102 would have resulted in three stall cycles. Consequently, use of the reduced length pipeline to execute Instruction 2 allows Instruction 3 to be executed with less delay than had Instruction 2 been executed using the full length of the pipeline 102. Thus, by reducing the length of the pipeline applied to execute Instruction 2, pipeline latency is reduced, and performance of the system 100 is improved.

In some embodiments of the pipeline 102, the latency reduction logic 112 may perform only those operations of subsequent pipeline stages that are needed to reduce pipeline latency caused by execution of a selected instruction. Operations of the selected instruction execution not resulting in additional pipeline latency may be performed by the subsequent pipeline stages.

Figure 3:
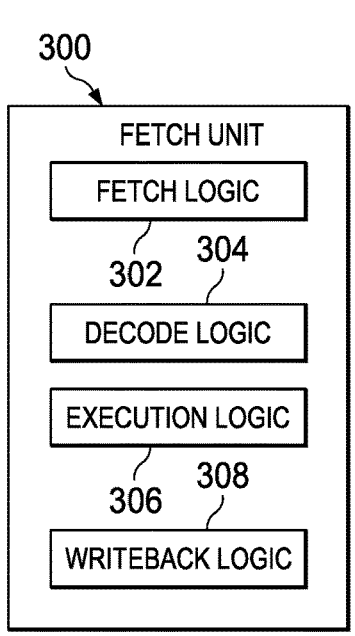
FIG. 3 shows a block diagram of a fetch unit in accordance with various embodiments.

In some embodiments of the pipeline 102, a fetch stage of the pipeline 102 includes a fetch unit that includes an embodiment of the latency reduction logic 112 and the pipeline control logic 114. In one such embodiment, the latency reduction logic 112 includes logic of each pipeline stage subsequent to the fetch stage for execution of program flow control instructions, such as jump, branch, call, etc., wholly in the fetch unit. FIG. 3 shows a block diagram of a fetch unit 300 including logic to execute flow control instructions in accordance with various embodiments. The fetch unit 300 includes fetch logic 302, decode logic 304, execution logic 306, and writeback logic 308 applicable to execute the flow control instructions. The decode logic 304 can identify the flow control instructions. The execution logic 306 can determine the effect of an identified flow control instruction on the instruction stream. For example, the execution logic 306 may determine whether the identified flow control instruction redirects the instruction stream to a non-sequential instruction address, and determine the address of the next instruction to be executed. The writeback logic 308 can update a pointer to the next instruction to be executed. The fetch unit 300 may execute the operations of the logic 302-308 in a single pipeline cycle, or in fewer pipeline cycles than would be required to execute the equivalent operations using pipeline stages subsequent to the fetch stage.

Figure 4:
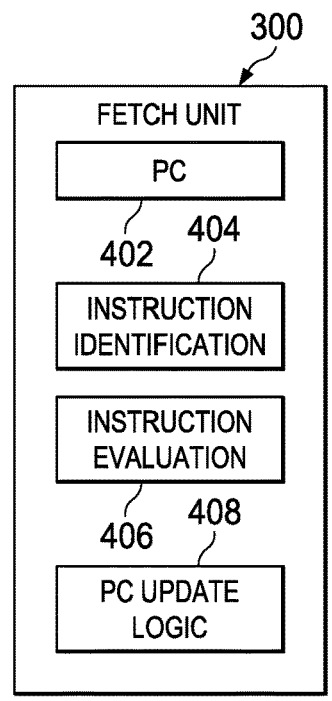
FIG. 4 shows an alternative block diagram of a fetch unit in accordance with various embodiments.

FIG. 4 shows an alternative block diagram of the fetch unit 300 in accordance with various embodiments. The block diagram of FIG. 4 shows the functionality provided by the logic 304-308. The fetch unit 300 includes a program counter (PC) 402, instruction identification logic 404, instruction evaluation logic 406, and PC update logic 408. The PC 402 stores the address of the next instruction to be fetched and executed. The instruction identification logic 404 determines whether an instruction fetched is a flow control instruction. For example, the instruction identification logic 404 may compare opcodes of flow control instructions to the opcode of the current instruction.

The instruction evaluation logic 406 determines whether execution of the instruction changes the address of the next instruction to be executed. For example, whether the current instruction is conditional may be determined, and if a condition code or other information needed to determine whether the program counter is to be nonsequentially updated is available, then the effect of execution of the instruction on the program address can be determined. If the instruction changes the address of the next instruction to be fetched, then the PC update logic 408 determines the address of the next instruction to be fetched, and provides the updated address to the PC 402. The PC update logic 408 may include adders and other logic to modify the current PC based on an offset value, an address value, etc. provided with the instruction or otherwise stored in or available to the system 100 (e.g., stored in a general purpose register).

Figure 5:
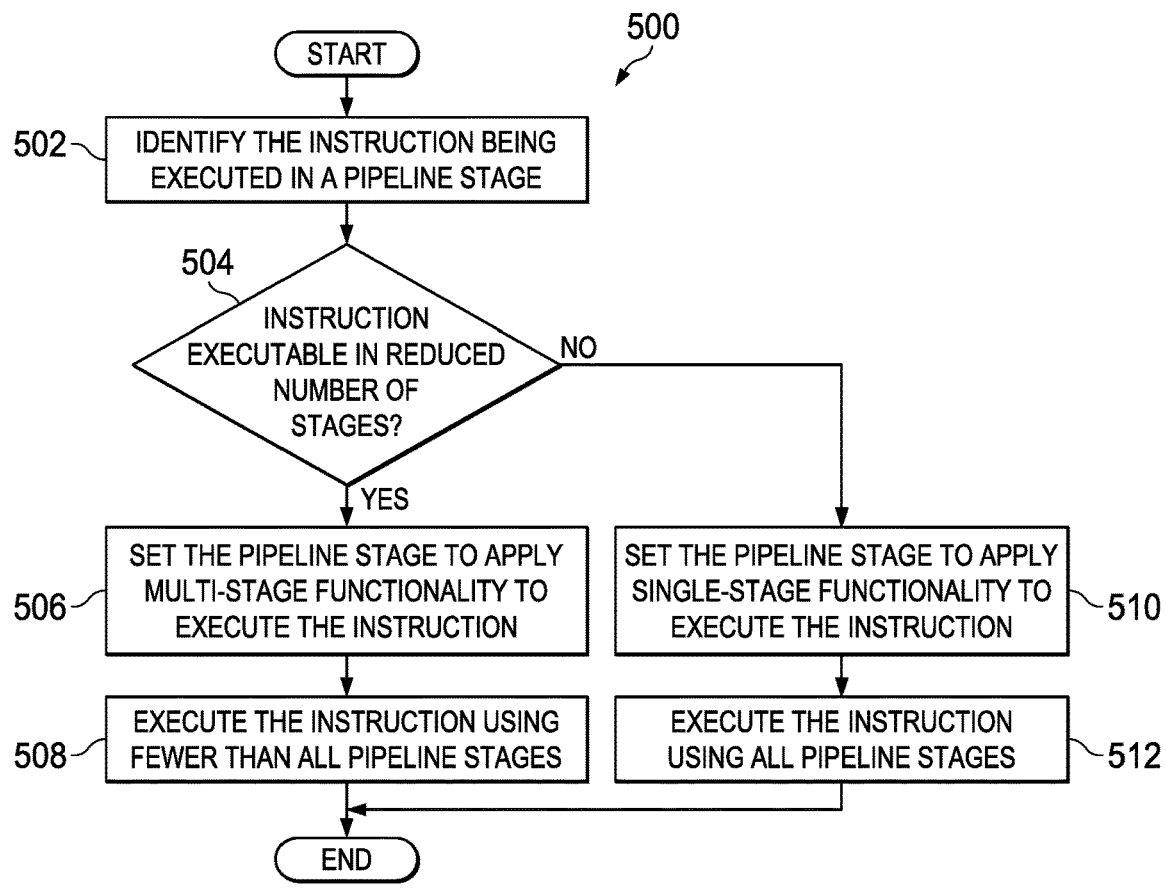
FIG. 5 shows flow diagram for a method for executing instructions in an execution pipeline in accordance with various embodiments.

FIG. 5 shows flow diagram for a method 500 for executing instructions in an execution pipeline in accordance with various embodiments. Though depicted sequentially as a matter of convenience, at least some of the actions shown can be performed in a different order and/or performed in parallel. Additionally, some embodiments may perform only some of the actions shown.

In block 502, the pipeline control logic 114 identifies the instruction being executed in pipeline stage 106. Pipeline stage 106 includes latency reduction logic 112 that allows stage 106 to execute one or more selected instructions in the pipeline stage 106 without use of subsequent pipeline stages. The latency reduction logic 112 provides the functionality of subsequent stages needed to execute the one or more selected instructions without use of the subsequent stages.

The effect of execution of the instruction on the pipeline 102 may also be determined.

If, in block 504, the instruction is identified as being an instruction that can be executed in a pipeline including a reduced number of stages, e.g., no stages subsequent to stage 106, then in block 506 the pipeline stage 106 may be set to apply the functionality of the latency reduction logic 112 to execute the instruction. That is, stage 106 may be set to execute the instruction using a reduced length pipeline. Whether the instruction is to be executed in the reduced length pipeline may also be determined based on the determined effect of execution of the instruction. For example, if the instruction can be executed using fewer than all pipeline stages, but execution of the instruction using all pipeline stages does not detrimentally affect the pipeline (e.g., cause a hazard), then stage 106 may be set to execute the instruction without using the latency reduction logic 112.

In block 508, the instruction is executed using fewer than all the stages of the pipeline 102 (e.g., using no stages subsequent to stage 106).

If, in block 504, the instruction is identified as being an instruction that cannot be executed in a pipeline including a reduced number of stages, e.g., the latency reduction logic 112 lacks the functionality to execute the instruction without use of stages subsequent to stage 106, then in block 510 the pipeline stage 106 may be set to apply single stage functionality to execute the instruction. That is, stage 106 may be set to execute the instruction using the full length pipeline, where stage 106 does not apply the functionality of the latency reduction logic 112. Whether the instruction is to be executed in the full length pipeline may also be determined based on the determined effect of execution of the instruction. For example, if the instruction can be executed using fewer than all pipeline stages, but execution of the instruction using all pipeline stages does not cause a pipeline hazard, then the instruction may be executed using the full length pipeline.

In block 512, the instruction is executed using all the stages of the pipeline 102.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor comprising:
   an instruction processing pipeline including:
     a plurality of stages including:
       a fetch stage including circuitry configured to perform a fetch function on a first instruction;
       a decode stage coupled to the fetch stage and including circuitry configured to perform a decode function on the first instruction; and
       an execution stage coupled to the decode stage and including circuitry configured to perform an execute function on the first instruction;
     a latency reduction circuit included within a first stage selected from a group consisting of: the fetch stage and the decode stage, the latency reduction circuit including circuitry configured to perform the execute function on the first instruction in the first stage in which the latency reduction circuit is included; and
     a pipeline control circuit coupled to the latency reduction circuit and configured to identify the first instruction and determine whether the execute function is to be performed on the first instruction in the execution stage or whether the execute function and the decode function are to be performed on the first instruction in the first stage based on determining whether performing the execute function on the first instruction in the execution stage would cause a delay in execution of a second instruction that depends on a result of the first instruction, wherein the pipeline control circuit is further configured to stall the instruction processing pipeline for a single pipeline cycle in response to the pipeline control circuit determining that the execute function is to be performed on the first instruction by the latency reduction circuit in the first stage.

2. The processor of claim 1, wherein, when the pipeline control circuit determines that the execute function is to be performed on the first instruction in the first stage in which the latency reduction circuit is included and the latency reduction circuit is included within the decode stage, the execute function is performed on the first instruction by the latency reduction circuit in the decode stage and is not performed on the first instruction by the circuitry of the execution stage.

3. The processor of claim 1, wherein, when the latency reduction circuit performs the execute function on the first instruction, the latency reduction circuit is further configured to store a result of the execute function in a memory.

4. The processor of claim 1, wherein:
the plurality of stages includes a writeback stage coupled to the execution stage and having circuitry configured to write a result of performing the execute function on the first instruction into a memory;
the latency reduction circuit includes circuitry configured to write, to the memory, the result of performing the execute function on the first instruction by the latency reduction circuit in a stage other than the writeback stage; and
the pipeline control circuit is further configured to determine whether the result of performing the execute function on the first instruction is written to the memory by the writeback stage or by the latency reduction circuit.

5. The processor of claim 1, wherein the latency reduction circuit is included within the decode stage, and the latency reduction circuit includes:
the circuitry configured to perform the execute function on the first instruction in the decode stage; and
circuitry configured to write a result of the execute function on the first instruction produced by the latency reduction circuit in the decode stage.

6. A processor comprising:
an instruction processing pipeline including:
a plurality of stages including:
a fetch stage including circuitry configured to perform a fetch function on a first instruction;
a decode stage coupled to the fetch stage and including circuitry configured to perform a decode function on the first instruction;
an execution stage coupled to the decode stage and including circuitry configured to perform an execute function on the first instruction; and
a writeback stage coupled to the execution stage and including circuitry configured to write a result of the execute function on the first instruction to a memory;
a latency reduction circuit included within the decode stage, the latency reduction circuit including circuitry configured to perform the execute function on the first instruction in the decode stage; and
a pipeline control circuit coupled to the latency reduction circuit and configured to identify the first instruction and determine whether the execute function is to be performed on the first instruction by the execution stage or the decode function and the execute function are to be performed on the first instruction by the decode stage based on determining whether performing the execute function on the first instruction by the execution stage would cause a delay in execution of a second instruction that depends on a result of the first instruction, wherein the pipeline control circuit is configured to stall the instruction processing pipeline for a single pipeline cycle in response to the pipeline control circuit determining that the execution function is to be performed on the first instruction by the latency reduction circuit in the decode stage.

7. The processor of claim 6, wherein the latency reduction circuit additionally includes circuitry configured to write, in a stage other than the writeback stage, the result of the execute function on the first instruction by the latency reduction circuit to the memory.

8. The processor of claim 6, wherein the latency reduction circuit is configured to perform functions of the circuitry of the execution stage and the circuitry of the writeback stage.

9. A processor comprising:
a fetch stage that includes:
fetch logic configured to perform a fetch operation;
decode logic configured to perform a decode operation; and
execute logic configured to perform an execute operation;
a decode stage coupled to the fetch stage that is different from the decode logic of the fetch stage and is configured to perform the decode operation;
an execute stage coupled to the decode stage that is different from the execute logic of the fetch stage and is configured to perform the execute operation; and
control logic coupled to the fetch stage and configured to:
determine whether performing of the execute operation on a first instruction using the execute stage would delay a second instruction that depends on the first instruction;
determine whether to cause the decode logic and the execute logic of the fetch stage or the decode stage and the execute stage to perform the decode operation and the execute operation on the first instruction based on whether the performing of the execute operation on the first instruction using the execute stage would delay the second instruction; and
determine whether to stall the fetch stage, the decode stage, and the execute stage based on whether the execute operation is to be performed on the first instruction using the decode logic and the execute logic of the fetch stage.

10. The processor of claim 9, wherein:
the execute stage is configured to perform a respective execute operation on each of a set of instructions; and
the execute logic is configured to perform a respective execute operation on each of a subset of the set of instructions.

11. The processor of claim 10, wherein the subset of the set of instructions is a set of flow control instructions.

12. The processor of claim 9 wherein:
the fetch stage includes writeback logic configured to perform a writeback operation on the first instruction;
the processor further comprises a writeback stage coupled to the execute stage that is different from the writeback logic and is configured to perform the writeback operation on the first instruction; and
the control logic is configured to determine whether to cause the writeback logic of the fetch stage or the writeback stage to perform the writeback operation on the first instruction.

* * * * *